US008302308B2

(12) United States Patent
Vaeth et al.

(10) Patent No.: US 8,302,308 B2
(45) Date of Patent: Nov. 6, 2012

(54) METHOD OF FORMING A PRINTHEAD

(75) Inventors: Kathleen M. Vaeth, Rochester, NY (US); Constantine N. Anagnostopoulos, Mendon, NY (US); John A. Lebens, Rush, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/556,087

(22) Filed: Sep. 9, 2009

(65) Prior Publication Data

US 2009/0320289 A1 Dec. 31, 2009

Related U.S. Application Data

(62) Division of application No. 11/350,158, filed on Feb. 8, 2006, now Pat. No. 7,607,227.

(51) Int. Cl.
*B21D 53/76* (2006.01)
*B23P 17/00* (2006.01)
*B41J 2/135* (2006.01)

(52) U.S. Cl. .......................................... 29/890.1; 347/44

(58) Field of Classification Search ................. 29/890.1; 347/20, 40, 44–45
See application file for complete search history.

(56) References Cited

U.S. PATENT DOCUMENTS

| | | | | | |
|---|---|---|---|---|---|
| 4,775,444 | A * | 10/1988 | Cordani | 216/20 |
| 4,889,584 | A * | 12/1989 | Wada et al. | 216/17 |
| 4,944,836 | A * | 7/1990 | Beyer et al. | 438/633 |
| 5,229,785 | A * | 7/1993 | Leban | 347/47 |
| 5,291,226 | A * | 3/1994 | Schantz et al. | 347/63 |
| 5,374,503 | A * | 12/1994 | Sachdev et al. | 430/323 |
| 5,378,137 | A * | 1/1995 | Asakawa et al. | 425/174.4 |
| 5,441,849 | A * | 8/1995 | Shiraishi et al. | 430/296 |
| 5,469,199 | A * | 11/1995 | Allen et al. | 347/42 |
| 5,848,465 | A * | 12/1998 | Hino et al. | 29/825 |
| 6,209,203 | B1 * | 4/2001 | Murthy et al. | 29/890.1 |
| 6,368,515 | B1 * | 4/2002 | Kaminishi et al. | 216/27 |
| 6,412,928 | B1 * | 7/2002 | Anagnostopoulos et al. | 347/77 |
| 6,450,619 | B1 * | 9/2002 | Anagnostopoulos et al. | 347/59 |
| 6,491,376 | B2 * | 12/2002 | Trauernicht et al. | 347/47 |
| 6,663,221 | B2 * | 12/2003 | Anagnostopoulos et al. | 347/40 |
| 6,671,949 | B2 * | 1/2004 | Yoshioka et al. | 29/852 |
| 7,055,938 | B1 * | 6/2006 | Ohkuma et al. | 347/65 |
| 2003/0052947 | A1 * | 3/2003 | Lin et al. | 347/63 |
| 2004/0246292 | A1 * | 12/2004 | Hashimoto et al. | 347/20 |
| 2007/0011876 | A1 * | 1/2007 | Silverbrook et al. | 29/890.1 |

FOREIGN PATENT DOCUMENTS

| | | |
|---|---|---|
| FR | 2816525 | 5/2002 |
| JP | 05029211 A | 2/1993 |

* cited by examiner

*Primary Examiner* — David Angwin
(74) *Attorney, Agent, or Firm* — William R. Zimmerli

(57) ABSTRACT

A method of manufacturing a printhead includes providing a polymeric substrate having a surface; providing a patterned material layer on the surface of the polymeric substrate; and removing at least some of the polymeric substrate not covered by the patterned material layer using an etching process.

2 Claims, 11 Drawing Sheets

METHOD OF FORMING A PRINTHEAD

CROSS REFERENCE TO RELATED APPLICATIONS

This is a divisional application of U.S. application Ser. No. 11/350,158 filed Feb. 8, 2006 now U.S. Pat. No. 7,607,227, which is related to U.S. Patent Publication No. 2007/0182777.

FIELD OF THE INVENTION

This invention relates generally to the formation of fluid chambers and/or passageways in polymeric substrates and the devices incorporating these substrates and, in particular to printheads incorporating polymeric substrates and the formation of these printheads.

BACKGROUND OF THE INVENTION

Printheads having nozzle plates made from a polymer material are known. For example, US Patent Application Publication No. US 2003/0052947 A1, published Mar. 20, 2003, discloses a printhead and a method for manufacturing a printhead in which a silicon substrate having a thermal element is covered with a photoresist layer or polymer material. The photoresist layer or polymer material form a barrier layer over the silicon substrate. A sandblasting process is used to make a slot on the silicon substrate. The slot forms an ink channel of the printhead. A photolithographic process is used to form a pattern on the barrier layer. The barrier layer is then etched to form ink cavities in fluid communication with the ink channel and form pillars located between the ink chambers. The barrier layer is then attached onto a polymer nozzle plate using a lamination process. The nozzles of the polymer nozzle plate are formed using a laser ablation or photoresist lithographic process.

However, the polymer nozzle plate can sink when it is laminated to the barrier layer, see, for example, FIGS. 1 and 2 of US Patent Application Publication No. US 2003/0052947 A1. This results in skewed ejection directions when ink is ejected from the nozzles of the polymer nozzle plate. The structural rigidity of the printhead can also be compromised especially when the printhead length approaches lengths commonly associated with page wide printheads. Additionally, alignment of the polymer nozzle plate to the structures in the silicon substrate can be difficult when the polymer nozzle plate is laminated to the silicon substrate.

U.S. Pat. No. 5,291,226, issued Mar. 1, 1994, also discloses an inkjet printhead that includes a nozzle member formed from a polymer material that has been laser ablated to form inkjet orifices, ink channels, and vaporization chambers in the nozzle member. The nozzle member is then mounted to a substrate containing heating elements associated with each orifice.

However, the laser ablation process is a relatively dirty process. Often, the polymer material needs to be cleaned after it has been laser ablated which adds cost and additional steps to the fabrication process. Also, it can be difficult to precisely place the features, created by the laser ablation process, over larger areas of the polymer material. Additionally, laser ablation is not a standard microelectronic process. As such, the complexity of the fabrication process, for example, the fabrication process for monolithic printheads with integrated electronics, is increased.

SUMMARY OF THE INVENTION

According to one feature of the present invention, a method of manufacturing a printhead includes providing a polymeric substrate having a surface; providing a patterned material layer on the surface of the polymeric substrate; and removing at least some of the polymeric substrate not covered by the patterned material layer using an etching process.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
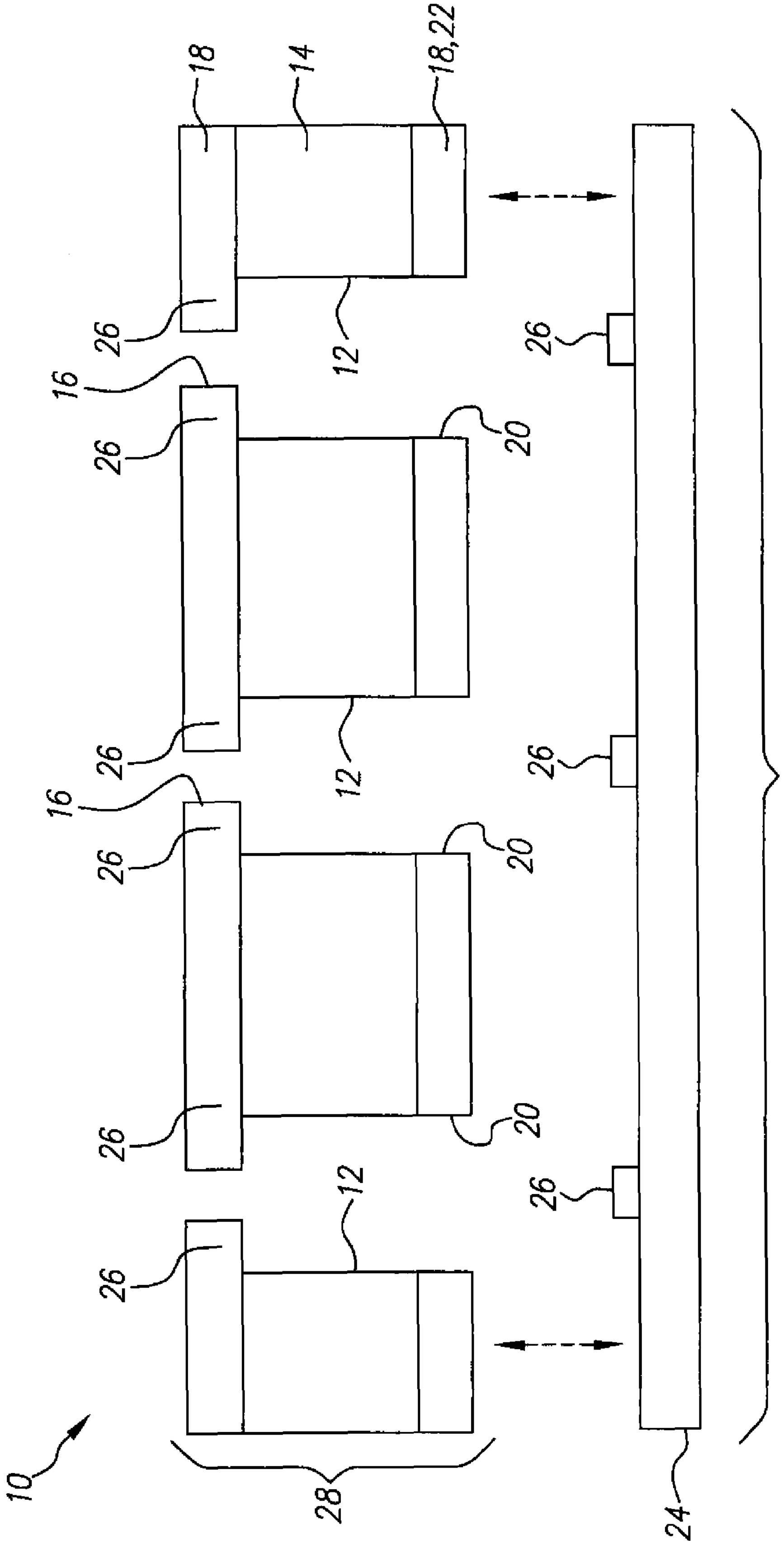
FIG. 1 is a schematic view of first and second example embodiments of the invention.

The present description will be directed in particular to elements forming part of, or cooperating more directly with, apparatus in accordance with the present invention. It is to be understood that elements not specifically shown or described may take various forms well known to those skilled in the art. In the following description, identical reference numerals have been used, where possible, to designate identical elements.

Although the term printhead is used herein, it is recognized that printheads are being used today to eject other types of fluids and not just ink. For example, the ejection of various fluids such as medicines, inks, pigments, dyes, conductive and semi-conductive organics, metal particles, and other materials is possible today using a printhead. As such, the term printhead is not intended to be limited to just devices that eject ink.

Referring to FIG. 1, first and second example embodiments of the invention are shown. A printhead 10 includes a liquid chamber 12 made from a polymeric substrate 14. A nozzle bore(s) 16 made from another material 18 is in fluid communication with the liquid chamber 12. While shown as a single layer in FIG. 1 (and FIGS. 2 through 7B), material 18 (and/or 18*a* and/or 18*b*) can include a plurality of material layers with each layer being made from the same material or different types of materials. Additionally, when material layers 18*a* and 18*b* are used, each material layer 18*a* and 18*b* can include a plurality of material layers with each layer being made from the same material or different types of materials.

Optionally, the printhead 10 can include a liquid, for example, ink, channel 20 made from material 18 or another material 22 having properties similar to that of material 18. Liquid channel 20 is in fluid communication with liquid chamber 12. Liquid chamber 12, nozzle bore 16, and, optionally, liquid channel 20 form a nozzle plate 28 of printhead 10. Material 22 can also include a plurality of material layers, with each layer being made from the same material or different types of materials.

Printhead 10 also includes a manifold 24. Manifold 24 can include a liquid channel(s) like liquid channel 20 and/or a drop forming mechanism(s) 26 associated with one or more liquid chambers 12, as is known in the art. Drop forming mechanism 26 can be a heater, piezoelectric actuator, etc. Alternatively or additionally, drop forming mechanism(s) 26, for example, one or a plurality of heaters, can be included in material 18 (and/or 18*a* and/or 18*b*) as described in, for example, U.S. Pat. No. 6,412,928 B1, issued Jul. 2, 2002, to Anagnostopoulos et al.; U.S. Pat. No. 6,450,619 B1, issued Sep. 17, 2002, to Anagnostopoulos et al.; and U.S. Pat. No. 6,491,376 B2, issued Dec. 10, 2002, to Trauernicht et al. When this occurs, drop forming mechanism(s) 26 is typically positioned about nozzle bore(s) 16. Regardless of where drop forming mechanism(s) 26 is located, drop forming mechanism(s) 26 is operable to form liquid drops from liquid located in liquid chamber 12 in either a continuous or drop on demand manner as is known in the art.

Material 18 is commonly referred to as a hard coat bore material, for example, silicon nitride, silicon oxynitride, silicon oxide, poly(siloxanes), poly(silanes), or poly(benzocyclobutene) (BCB). Nozzle bore(s) 16 are formed in material 18. As such, material 18 helps to define nozzle bore 16 in that nozzle bore 16 is formed from a different material and in a different material layer when compared to other features, for example, liquid chamber 12, or material layers, for example, polymeric substrate 14, of printhead 10. Typically, material 18 is harder than the other materials that make up printhead 10. However, material 18 can be selected such that it is just as hard or slightly less hard than the other materials that make up printhead 10. The etch rate of material 18 is at least equal to or slower than that of polymeric substrate 14 for the etchant chemistry used in preferred example embodiments of the invention. Typically, material 18 is also thicker than the material(s), for example, metal materials, used to form nozzle bores described in the prior art. However, material 18 is thinner than the polymeric substrate 14 in preferred example embodiments of the invention.

The first example embodiment of the invention does not include liquid channel 20 and is described in more detail with reference to FIG. 2. In this embodiment, manifold 24 may or may not include one or more liquid channels so that liquid chamber(s) 12 can be refilled after fluid is ejected through nozzle bore 16 using drop forming mechanism 26.

The second example embodiment of the invention includes liquid channel 20 and is described in more detail with reference to FIG. 3. In this embodiment, manifold 24 may or may not include one more liquid channels so that liquid chamber (s) 12 can be refilled after fluid is ejected through nozzle bore 16 using drop forming mechanism 26.

Figure 2:
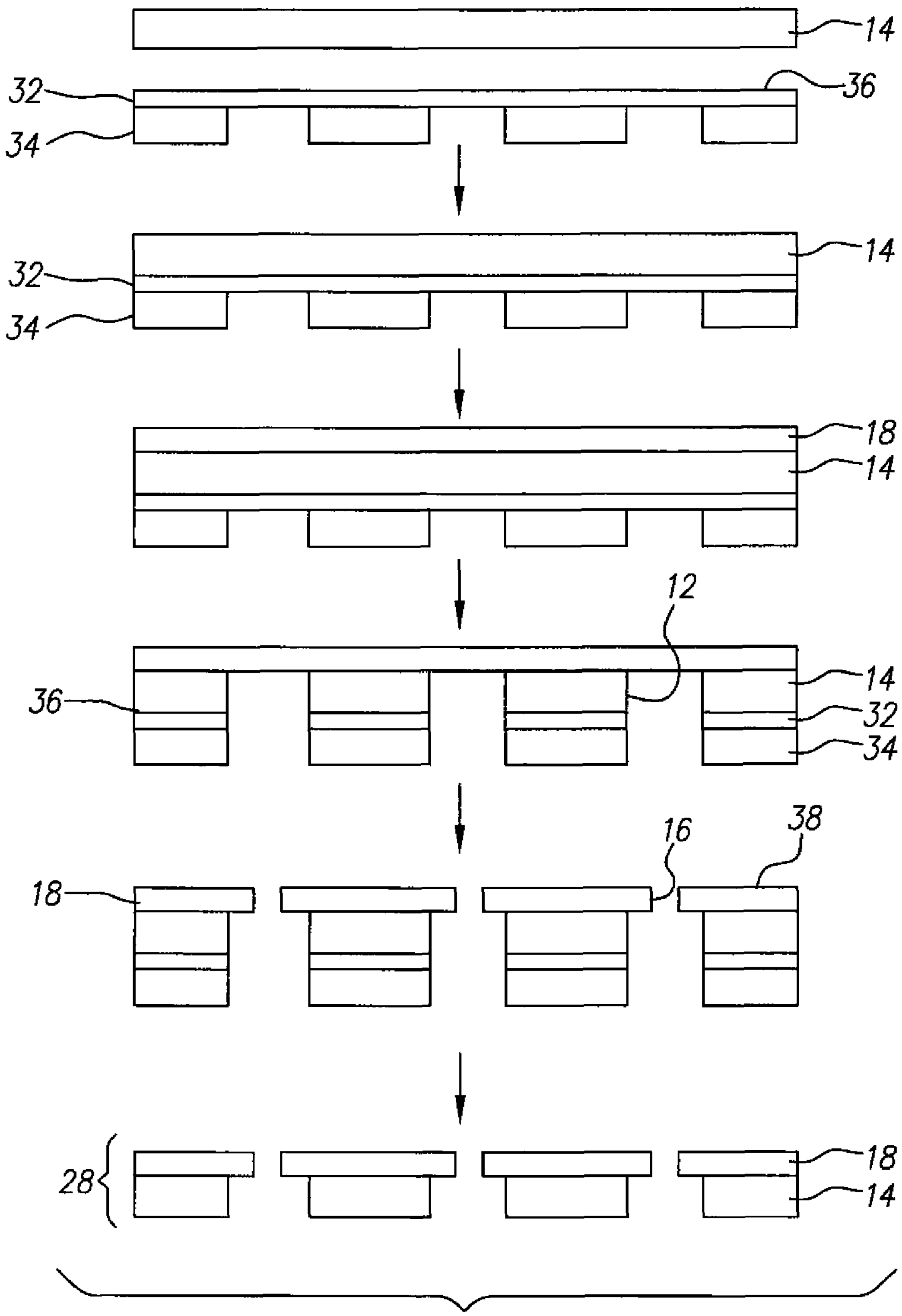
FIG. 2 is a schematic view describing an embodiment of the manufacturing process associated with the formation of the first example embodiment of the invention.

Referring to FIG. 2, the formation of nozzle plate 28 of the first example embodiment of the invention is shown. After completion of the fabrication process, nozzle plate 28 is attached to manifold 24 using conventional processes known in the art.

This process begins with polymeric material substrate 14. Another substrate 32, made from, for example, glass or silicon, is laminated to one surface of polymeric substrate 14. A liquid chamber mask 34 is applied to substrate 32 either before or after substrate 32 is laminated to polymeric substrate 14. Optionally, the substrate 32 is patterned using mask 34 prior to lamination of polymeric substrate 14. Alternatively, substrate 32 can be patterned using maskless methods known in the art prior to lamination of polymeric substrate 14.

Material 18 is deposited on another surface of polymeric substrate 14. Liquid chamber 12 is formed by etching through substrate 32, the laminate 36, and at least some of polymeric substrate 14 using liquid chamber mask 34 as a guide. When substrate 32 is patterned prior to lamination of polymer substrate 14, then liquid chamber 12 can be formed by etching the laminate 36, and at least some of polymeric substrate 14 using substrate 32 as a guide.

A bore mask 38, for example, a photoresist or a thin metal layer, is applied to a surface of material 18 not contacting polymeric substrate 14. Nozzle bore 16 is formed by etching through material 18 using bore mask 38 as a guide, and, optionally, at least some of polymeric substrate 14 when at least some of the polymeric substrate 14 remains from the etching step described in the preceding paragraph. Bore mask 38 can be removed either during the etching process (when the etchant is selected such that it removes the bore mask 38 while removing material 18) or after etching is complete using conventional means. Alternatively, bore mask 38 can remain on the surface of material 18. When etching is complete, polymeric substrate 14 is delaminated from substrate 32 forming nozzle plate 28. Alternatively, polymeric substrate 14 can remain laminated to substrate 32 forming nozzle plate 28.

Figure 3:
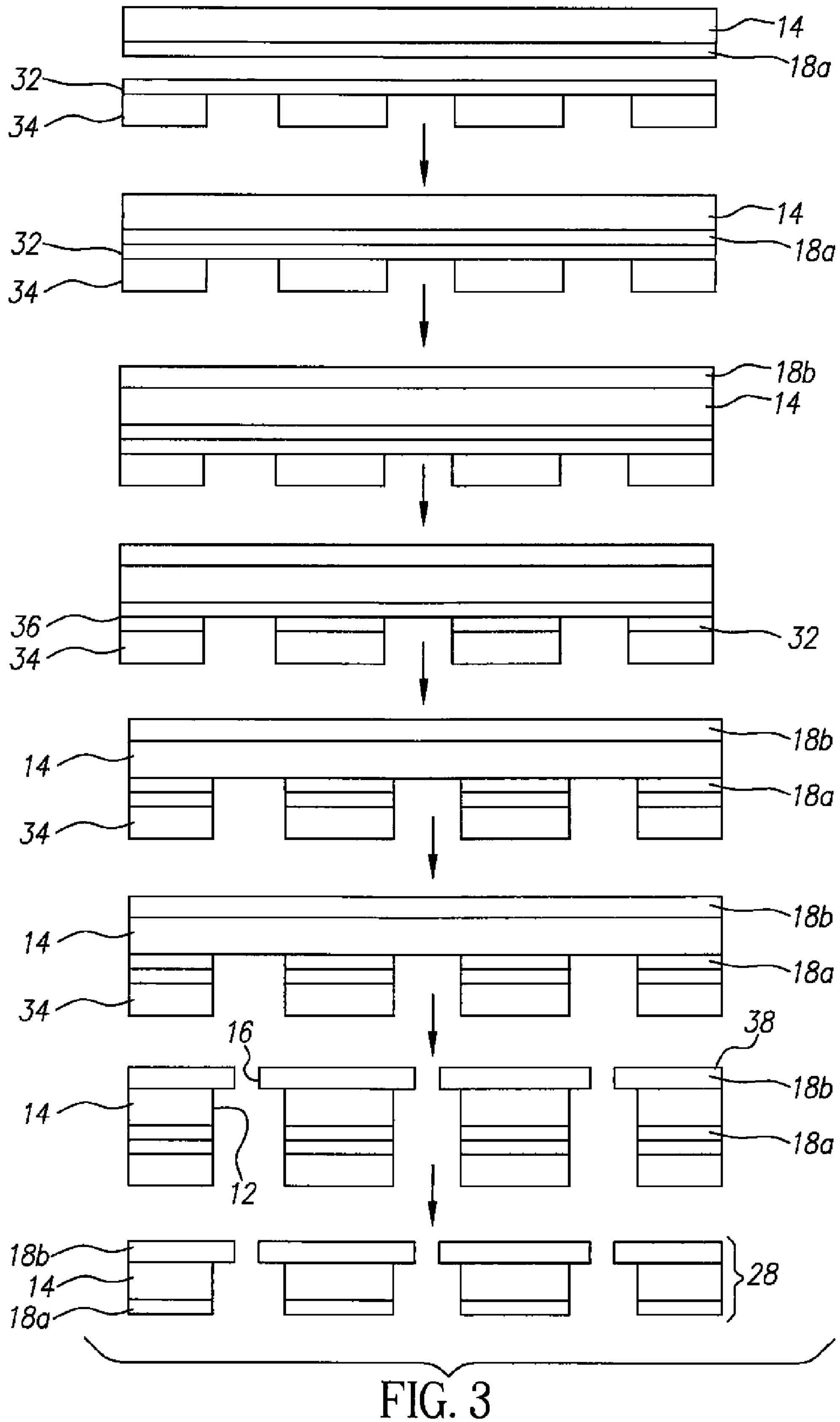
FIG. 3 is a schematic view describing an embodiment of the manufacturing process associated with the formation of the second example embodiment of the invention.

Referring to FIG. 3, the formation of nozzle plate 28 of the second example embodiment of the invention is shown. After completion of the fabrication process, nozzle plate 28 is attached to manifold 24 using conventional processes known in the art.

This process begins with a first material layer 18*a* being deposited on one surface of polymeric material substrate 14 and then flipped so that a surface of first material layer 18*a* not contacting polymeric substrate 14 can be laminated to substrate 32. This process is described in more detail with reference to FIG. 5, 6, or 7.

A liquid chamber mask 34 can be applied to substrate 32 either before or after substrate 32 is laminated to first material layer 18*a*. Optionally, the substrate 32 is patterned using mask 34 prior to lamination of polymeric substrate 14. Alternatively, substrate 32 can be patterned using maskless methods known in the art prior to lamination of polymeric substrate 14. After first material layer 18*a* is laminated to substrate 32, a second material layer 18*b* is deposited to the other surface of polymeric substrate 14. Liquid chamber 12 is formed by first etching through substrate 32, the laminate 36, and the first material layer 18*a*, and then etching at least some of polymeric substrate 14 using liquid chamber mask 34 as a guide. When substrate 32 is patterned prior to lamination of polymer substrate 14, then liquid chamber 12 can be formed by etching the laminate 36, first material layer 18*a*, and at least some of polymeric substrate 14 using substrate 32 as a guide.

A bore mask 38, for example, a photoresist or a thin metal layer, is applied to a surface of the second material layer 18*b* not contacting polymeric substrate 14. Nozzle bore 16 is formed by etching through second material layer 18*b* using bore mask 38 as a guide, and optionally, at least some of polymer substrate 14 when at least some of the polymeric substrate 14 remains from the etching step described in the preceding paragraph. Bore mask 38 can be removed either during the etching process (when the etchant is selected such that it removes the bore mask 38 while removing material 18*b*) or after etching is complete using conventional means. Alternatively, bore mask 38 can remain on the surface of material 18. When etching is complete, first material layer 18*a* is delaminated from substrate 32 forming nozzle plate 28. Alternatively, material layer 18*a* can remain laminated to substrate 32 forming nozzle plate 28.

Figure 4A:
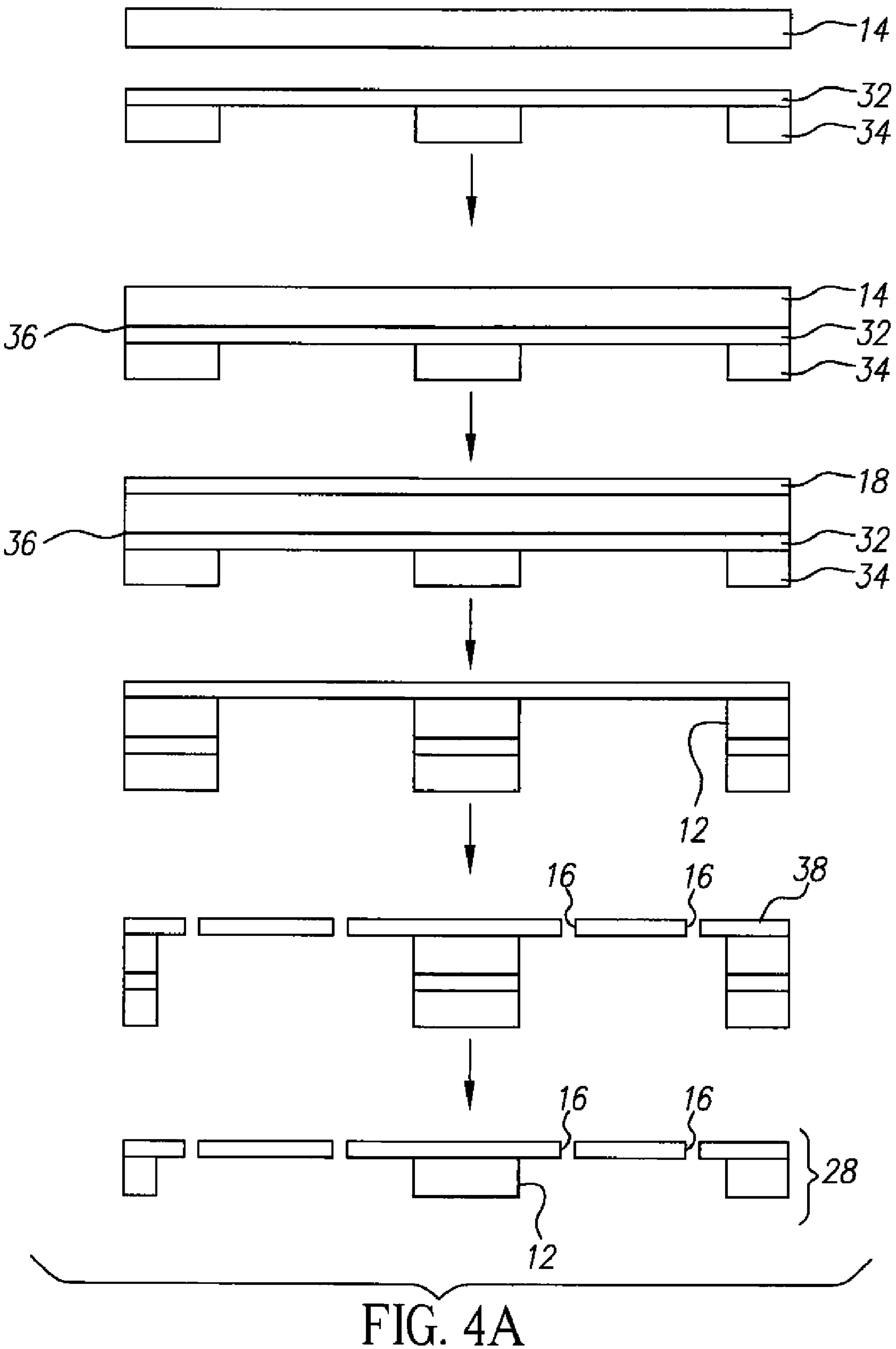
FIG. 4A is a schematic view describing an embodiment of the manufacturing process associated with the formation of a third example embodiment of the invention.

Referring to FIG. 4A, formation of a nozzle plate 28 having a larger liquid chamber 12, as compared to the liquid chambers described above, in fluid communication with a plurality of nozzle bores 16 is possible using the fabrication process of the invention.

This process begins with polymeric material substrate 14. Another substrate 32, made from, for example, glass or silicon is laminated to one surface of polymeric substrate 14. A liquid chamber mask 34 is applied to substrate 32 either before or after substrate 32 is laminated to polymeric substrate 14. Optionally, the substrate 32 is patterned using mask 34 prior to lamination of polymeric substrate 14. Alternatively, substrate 32 can be patterned using maskless methods known in the art prior to lamination of polymeric substrate 14. Mask 34 defines liquid chambers that are larger than the liquid chambers defined by mask 34 described above with reference to FIG. 2 or 3.

Material 18 is deposited on another surface of polymeric substrate 14. Liquid chamber 12 is formed by etching through substrate 32, the laminate 36, and at least some of polymeric substrate 14 using liquid chamber mask 34 as a guide. When substrate 32 is patterned prior to lamination of polymer substrate 14, then liquid chamber 12 can be formed by etching the laminate 36, and at least some of polymeric substrate 14 using substrate 32 as a guide.

A bore mask 38, for example, a photoresist or a thin metal layer, is applied to a surface of material layer 18 not contacting polymeric substrate 14. Nozzle bore 16 is formed by etching through material layer 18 using bore mask 38 as a guide, and optionally, at least some of polymer substrate 14 when at least some of the polymeric substrate 14 remains from the etching step described in the preceding paragraph. Bore mask 38 can be removed either during the etching process (when the etchant is selected such that it removes the bore mask 38 while removing material 18) or after etching is complete using conventional means. Alternatively, bore mask 38 can remain on the surface of material 18. When etching is complete, polymeric substrate 14 is delaminated from substrate 32 forming nozzle plate 28. Alternatively, polymeric substrate 14 can remain laminated to substrate 32 forming nozzle plate 28.

Figure 4B:
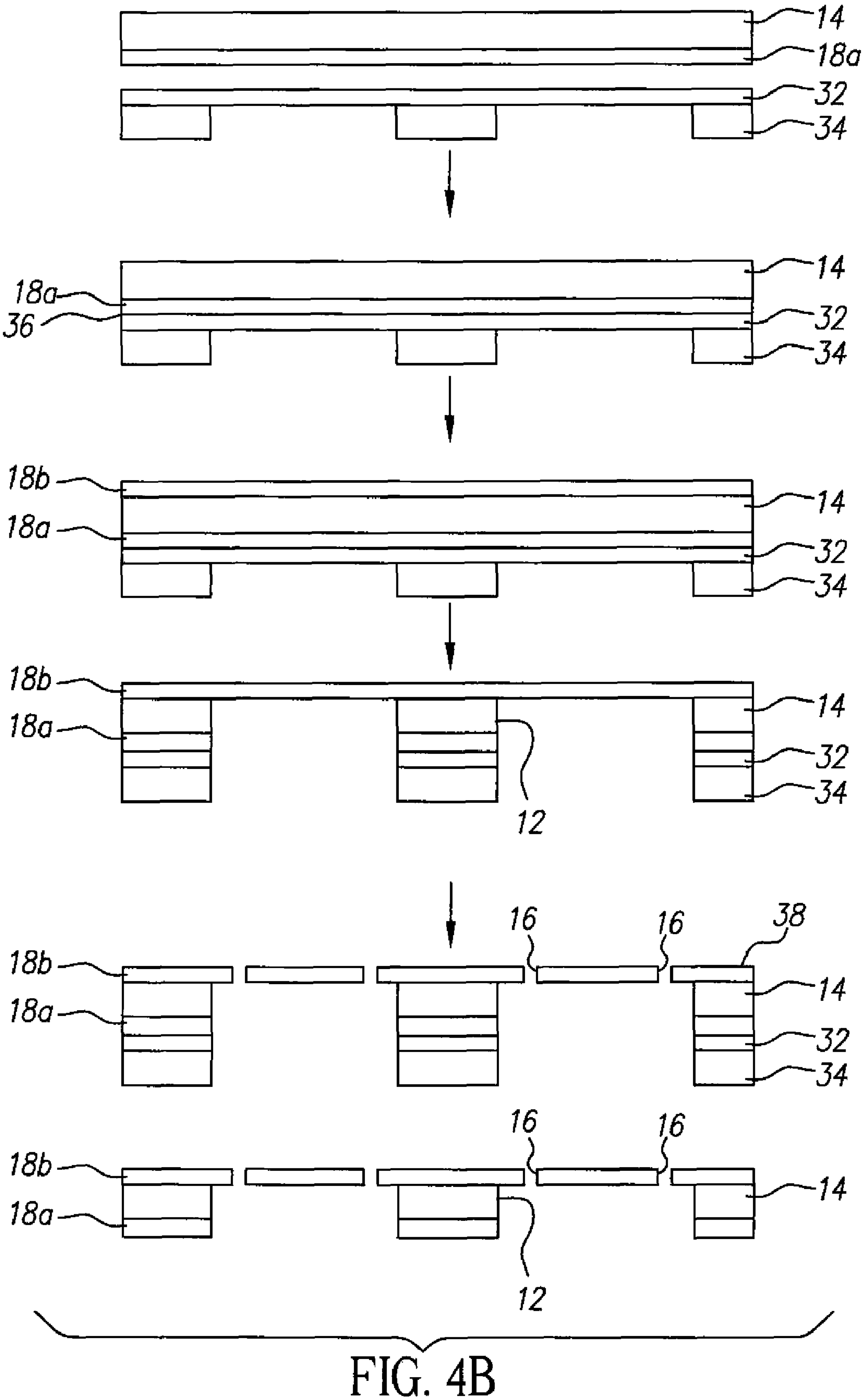
FIG. 4B is a schematic view describing an embodiment of the manufacturing process associated with the formation of a fourth example embodiment of the invention.

Referring to FIG. 4B, material 18 can be deposited on both sides of polymeric substrate 14 using a process like one of those described with reference to FIG. 3, 5, 6, or 7. When this is done, the process begins with polymeric substrate 14 being laminated to substrate 32 using a laminate 36. A first material layer 18*a* is deposited on a surface of polymeric substrate 14 not laminated to substrate 32. First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

A liquid chamber mask 34 can be applied to substrate 32 either before or after substrate 32 is laminated to first material layer 18*a*. Optionally, the substrate 32 is patterned using mask 34 prior to lamination of polymeric substrate 14. Alternatively, substrate 32 can be patterned using maskless methods known in the art prior to lamination of polymeric substrate 14. Liquid chamber 12 is formed by first etching through substrate 32, the laminate 36, and the first material layer 18*a*, and then etching at least some of polymeric substrate 14 using liquid chamber mask 34 as a guide. When substrate 32 is patterned prior to lamination of polymer substrate 14, then liquid chamber 12 can be formed by etching the laminate 36, first material layer 18*a*, and at least some of polymeric substrate 14 using substrate 32 as a guide.

A bore mask 38 is applied to a surface of material 18*b* not contacting polymeric substrate 14. Nozzle bores 16 are formed by etching through material 18*b* and, optionally, at least some of polymeric substrate 14 when at least some of polymeric substrate 14 remains from the etching step described in the preceding paragraph, using bore mask 38 as a guide. Bore mask 38 can be removed either during the etching process (when the etchant is selected such that it removes the bore mask 38 while removing material 18*b*) or after etching is complete using conventional means. Alternatively, bore mask 38 can remain on the surface of material 18. When etching is complete, first material layer 18*a* is delaminated from substrate 32 forming nozzle plate 28. Alternatively, material layer 18*a* can remain laminated to substrate 32 forming nozzle plate 28.

Figure 4C:
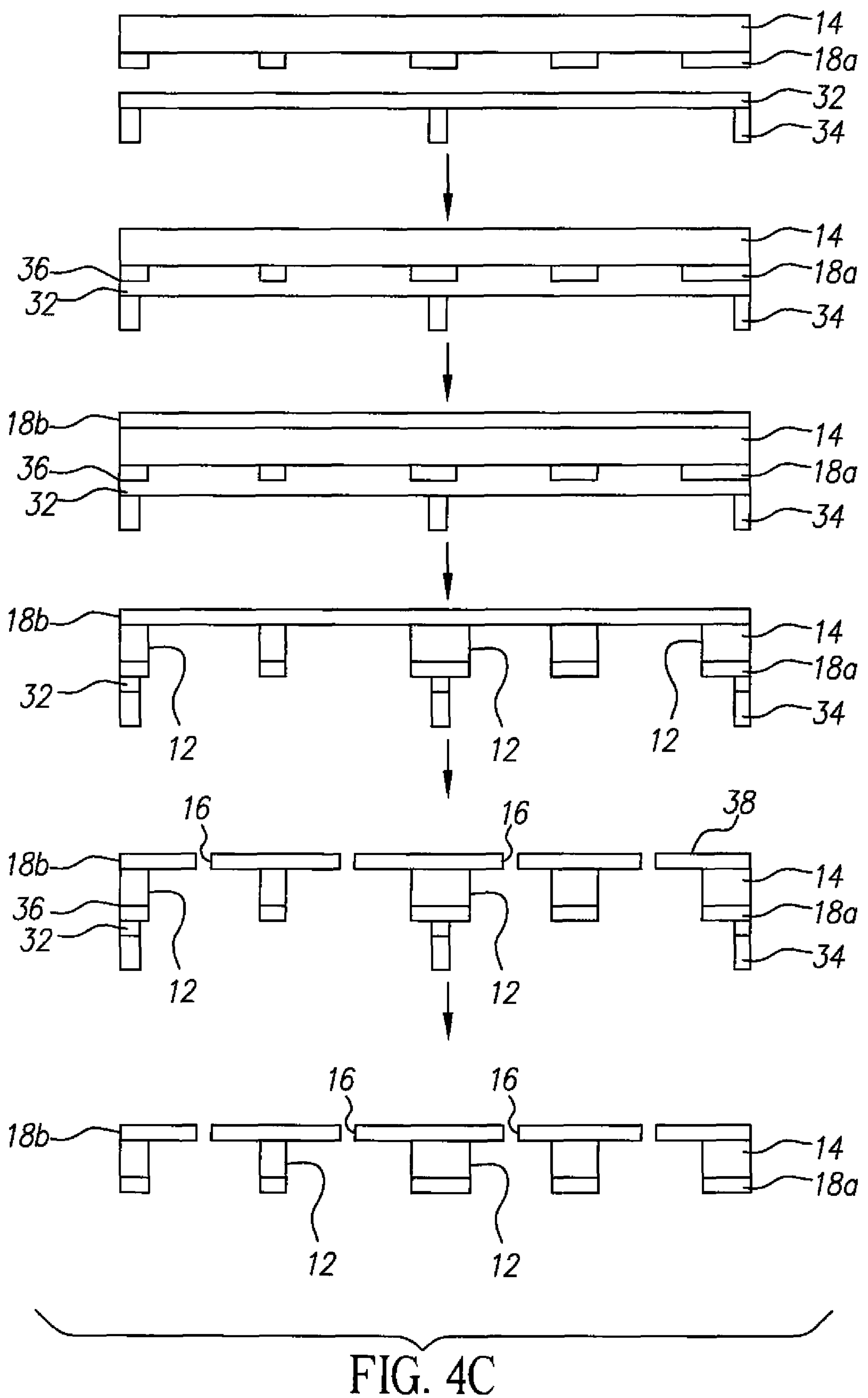
FIG. 4C is a schematic view describing an embodiment of the manufacturing process associated with the formation of a fifth example embodiment of the invention.

Referring to FIG. 4C, material 18 can be deposited on both sides of polymeric substrate 14 using a process like one of those described with reference to FIG. 3, 5, 6, or 7. When this is done, the process begins with polymeric substrate 14 being laminated to substrate 32 using a laminate 36. A first material layer 18*a* is deposited on a surface of polymeric substrate 14 not laminated to substrate 32. First material layer 18*a* is patterned with features smaller than those patterned in carrier substrate 32. First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

A liquid chamber mask 34 can be applied to substrate 32 either before or after substrate 32 is laminated to first material layer 18*a*. Optionally, the substrate 32 is patterned using mask 34 or other maskless methods known in the art prior to lamination of polymeric substrate 14. Liquid chamber 12 is formed by first etching through substrate 32, the laminate 36, and at least some of polymeric substrate 14 using first material layer 18*a* as a guide. When substrate 32 is patterned prior to lamination of polymer substrate 14, then liquid chamber 12 can be formed by etching the laminate 36, and at least some of polymeric substrate 14 using first material layer 18*a* as a guide.

A bore mask 38 is applied to a surface of material 18*b* not contacting polymeric substrate 14. Nozzle bores 16 are formed by etching through material 18*b* and, optionally, at least some of polymeric substrate 14 when at least some of polymeric substrate 14 remains from the etching step described in the preceding paragraph, using bore mask 38 as a guide. Bore mask 38 can be removed either during the etching process (when the etchant is selected such that it removes the bore mask 38 while removing material 18*b*) or after etching is complete using conventional means. Alternatively, bore mask 38 can remain on the surface of material 18. When etching is complete, first material layer 18*a* is delaminated from substrate 32 forming nozzle plate 28. Alternatively, material layer 18*a* can remain laminated to substrate 32 forming nozzle plate 28.

Liquid chamber 12 of the example embodiments of the invention can also be formed using etching processes commonly referred to as a backside etch (non-nozzle bore side), a front side etch (nozzle bore side), or a partial etch of both sides. The backside etch process of polymeric substrate 14 is described in more detail with reference to FIG. 5. The partial etch of both sides of polymeric substrate 14 is described in more detail with reference to FIGS. 6A and 6B. The front side etch process of polymeric substrate 14 is described in more detail with reference to FIGS. 7A and 7B.

Figure 5:
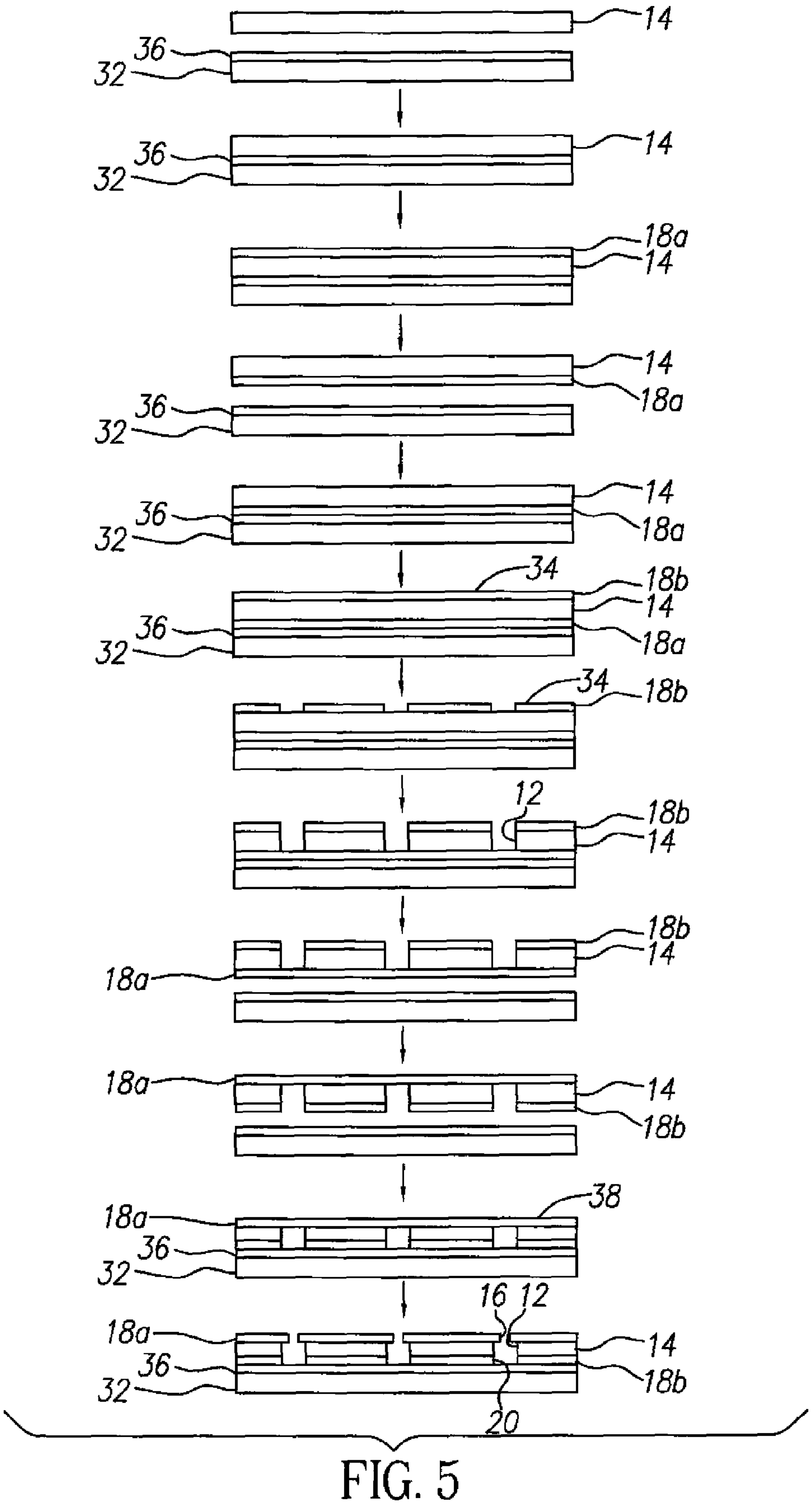
FIG. 5 is a schematic view describing another embodiment of the manufacturing process associated with the formation of the example embodiments of the invention.

Referring to FIG. 5, backside etching of polymeric substrate 14 begins with polymeric substrate 14 being laminated to substrate 32 using a laminate 36. A first material layer 18*a* is deposited on a surface of polymeric substrate not laminated to substrate 32. First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

A liquid chamber mask 34 is applied to second material layer 18*b*. Liquid chamber 12 is formed by etching through second material layer 18*b*, and polymeric substrate 14 using at least liquid chamber mask 34 as a guide. Etching second material layer 18*b* forms liquid channel 20. Material layer 18*b* and, optionally, some of polymeric substrate 14, can be etched such that liquid channel 20 is in fluid communication with one nozzle bore 16 or a plurality of nozzle bores 16.

In some etching processes, mask 34 serves as a mask when etching material layer 18*b*, and then, material layer 18*b* serves as the mask when etching polymeric substrate 14. Alternatively, mask 34 serves as the mask when etching material layer 18*b* and polymeric substrate 14.

Mask 34 can be removed either during the etching process (when the etchant is selected such that it removes mask 34 while removing material 18*b*) or after etching is complete using conventional means. Alternatively, mask 34 can remain on the surface of material 18*b*.

Second material layer 18*b*, polymeric substrate 14, and first material layer 18*a* are delaminated from substrate 32 and flipped. Second material layer 18*b* is laminated to substrate 32 so that a bore mask 38 can be applied to a surface of first material layer 18*a*. Nozzle bore 16 is formed by etching through first material layer 18*a* using bore mask 38 as a guide. When etching is complete, second material layer 18*b* is delaminated from substrate 32 forming nozzle plate 28. Bore mask 38 can be removed either during the etching process (when the etchant is selected such that it removes the bore mask 38 while removing material 18*b*) or after etching is complete using conventional means. Alternatively, bore mask 38 can remain on the surface of material 18.

Figure 6A:
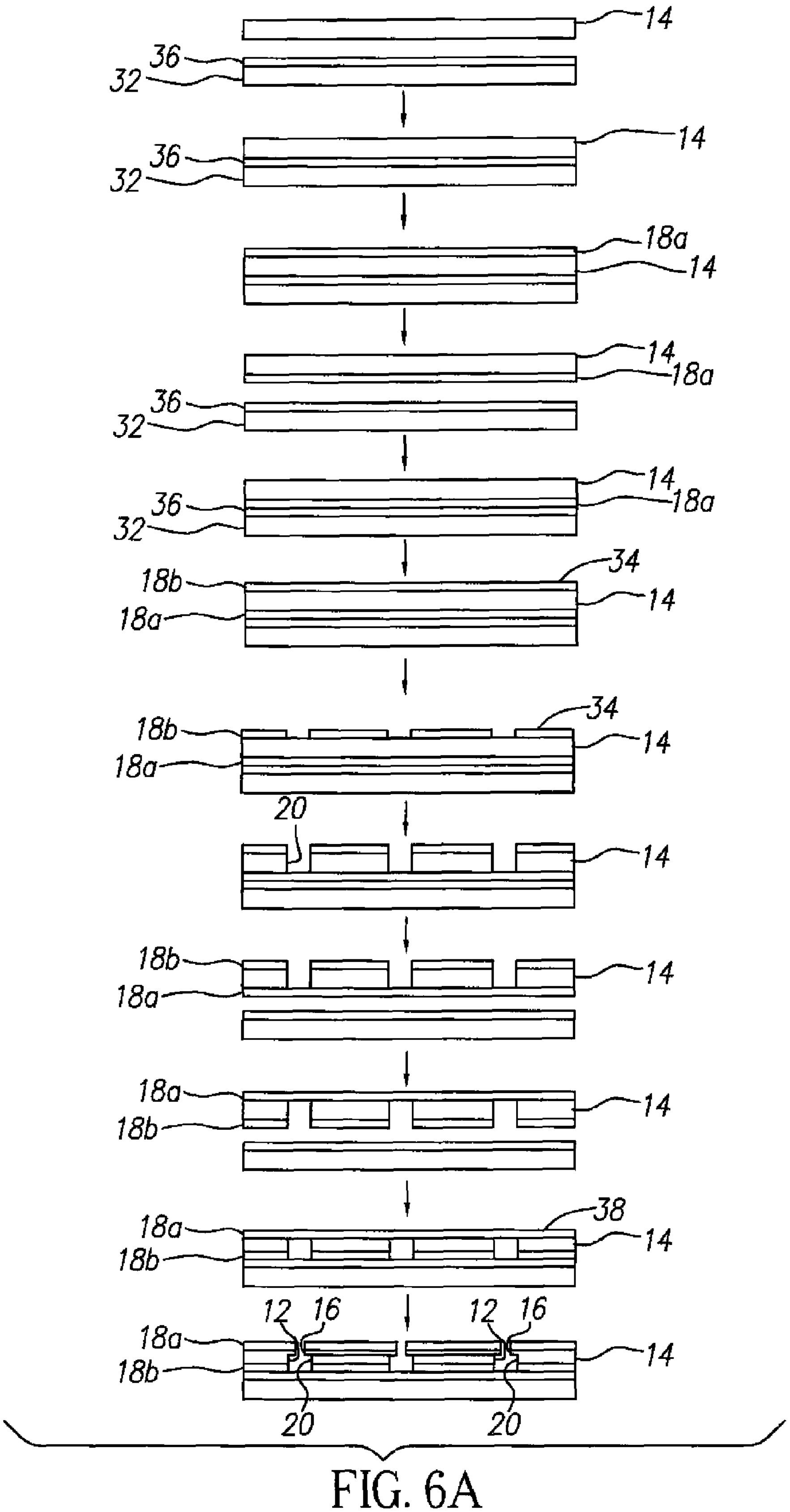
FIG. 6A is a schematic view describing another embodiment of the manufacturing process associated with the formation of the example embodiments of the invention.

Referring to FIG. 6A, partial etching of both sides of polymeric substrate 14 begins with polymeric substrate 14 being laminated to substrate 32 using a laminate 36. A first material layer 18*a* is deposited on a surface of polymeric substrate not laminated to substrate 32. First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

A liquid chamber mask 34 is applied to second material layer 18*b*. Liquid chamber 12 is formed by etching through second material layer 18*b*, and partially etching polymeric substrate 14 using at least liquid chamber mask 34 as a guide. Etching second material layer 18*b* forms liquid channel 20. Material layer 18*b* and, optionally, some of polymeric substrate 14, can be etched such that liquid channel 20 is in fluid communication with one nozzle bore 16 or a plurality of nozzle bores 16.

In some etching processes, mask 34 serves as a mask when etching material layer 18*b*, and then, material layer 18*b* serves as the mask when etching polymeric substrate 14. Alternatively, mask 34 serves as the mask when etching material layer 18*b* and polymeric substrate 14.

Mask 34 can be removed either during the etching process (when the etchant is selected such that it removes mask 34 while removing material 18*b*) or after etching is complete using conventional means. Alternatively, mask 34 can remain on the surface of material 18*b*.

Second material layer 18*b*, polymeric substrate 14, and first material layer 18*a* are delaminated from substrate 32 and flipped. Second material layer 18*b* is laminated to substrate 32 so that a bore mask 38 can be applied to a surface of first material layer 18*a*. Nozzle bore 16 is formed by etching through first material layer 18*a* and the remaining portion of polymeric substrate 14 using at least bore mask 38 as a guide.

In some etching processes, mask 38 serves as a mask when etching material layer 18*a*, and then, material layer 18*a* serves as the mask when etching the remaining portion of polymeric substrate 14. Alternatively, mask 38 serves as the mask when etching material layer 18*a* and the remaining portion of polymeric substrate 14.

Mask 38 can be removed either during the etching process (when the etchant is selected such that it removes mask 38 while removing material 18*a*) or after etching is complete using conventional means. Alternatively, mask 38 can remain on the surface of material 18*a*. When etching is complete, second material layer 18*b* is delaminated from substrate 32 forming nozzle plate 28.

Figure 6B:
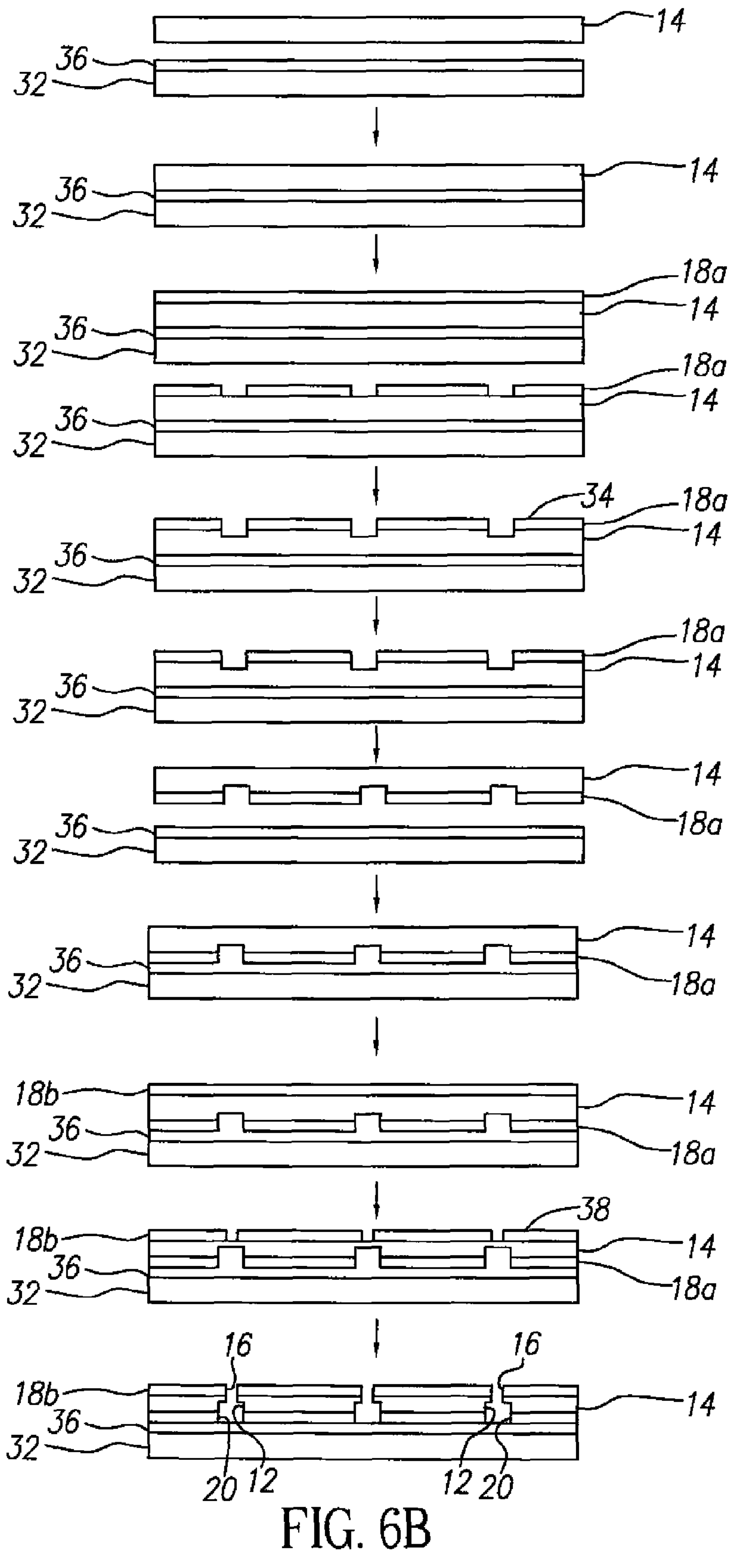
FIG. 6B is a schematic view describing another embodiment of the manufacturing process associated with the formation of the example embodiments of the invention.

Referring to FIG. 6B, partial etching of both sides of polymeric substrate 14 begins with polymeric substrate 14 being laminated to substrate 32 using a laminate 36. A first material layer 18*a* is deposited on a surface of polymeric substrate not laminated to substrate 32.

A liquid chamber mask 34 is applied to first material layer 18*a*. Liquid chamber 12 is formed by etching through first material layer 18*a*, and partially etching polymeric substrate 14 using at least liquid chamber mask 34 as a guide. Etching first material layer 18*a* forms liquid channel 20. Material layer 18*a* and, optionally, some of polymeric substrate 14, can be etched such that liquid channel 20 is in fluid communication with one nozzle bore 16 or a plurality of nozzle bores 16.

In some etching processes, mask 34 serves as a mask when etching material layer 18*a*, and then, material layer 18*a* serves as the mask when etching polymeric substrate 14. Alternatively, mask 34 serves as the mask when etching material layer 18*a* and polymeric substrate 14. Mask 34 can be removed either during the etching process (when the etchant is selected such that it removes mask 34 while removing material 18*a*) or after etching is complete using conventional means. Alternatively, mask 34 can remain on the surface of material 18*a*.

First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

Bore mask 38 can be applied to a surface of second material Layer 18*b*. Nozzle bore 16 is formed by etching through second material layer 18*b* and the remaining portion of polymeric substrate 14 using at least bore mask 38 as a guide.

In some etching processes, mask 38 serves as a mask when etching material layer 18*b*, and then, material layer 18*b* serves as the mask when etching the remaining portion of polymeric substrate 14. Alternatively, mask 38 serves as the mask when etching material layer 18*b* and the remaining portion of polymeric substrate 14. Mask 38 can be removed either during the etching process (when the etchant is selected such that it removes mask 38 while removing material 18*b*) or after etching is complete using conventional means. Alternatively, mask 38 can remain on the surface of material 18*b*. When etching is complete, first material layer 18*a* is delaminated from substrate 32 forming nozzle plate 28.

Figure 7A:
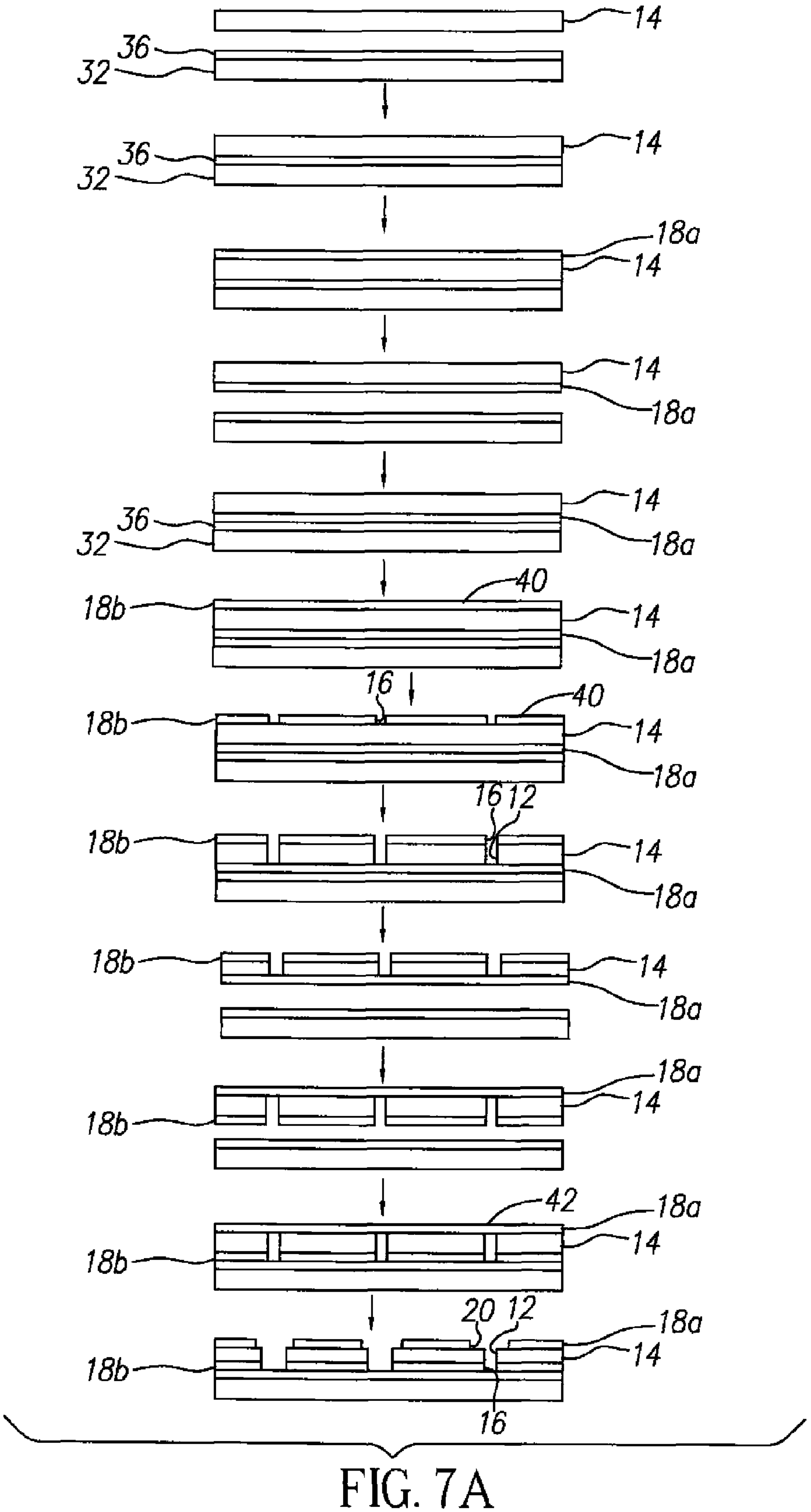
FIG. 7A is a schematic view describing another embodiment of the manufacturing process associated with the formation of the example embodiments of the invention.

Referring to FIG. 7A, front side etching of polymeric substrate 14 begins with polymeric substrate 14 being laminated to substrate 32 using a laminate 36. A first material layer 18*a* is deposited on a surface of polymeric substrate not laminated to substrate 32. First material layer 18*a* and polymeric substrate 14 are delaminated from substrate 32 and flipped so that a surface of first material layer 18*a* not contacting polymeric substrate 14 can be laminated to substrate 32 using laminate 36. A second material layer 18*b* is deposited to the surface of polymeric substrate 14 not contacting first material layer 18*a*.

A nozzle bore/liquid chamber mask 40 is applied to second material layer 18*b*. Nozzle bore 16 is formed by etching through second material layer 18*b* using at least bore/chamber mask 40 as a guide. Liquid chamber 12 can be partially formed by partially etching polymeric material substrate 14 or completely formed by fully etching polymeric material substrate 14 using at least bore/chamber mask 40 as a guide.

In some etching processes, mask 40 serves as a mask when etching material layer 18*b*, and then, material layer 18*b* serves as the mask when etching polymeric substrate 14. Alternatively, mask 40 serves as the mask when etching material layer 18*b* and polymeric substrate 14.

Mask 40 can be removed either during the etching process (when the etchant is selected such that it removes mask 40 while removing material 18*b*) or after etching is complete using conventional means. Alternatively, mask 40 can remain on the surface of material 18*b*.

Second material layer 18*b*, polymeric substrate 14, and first material layer 18*a* are delaminated from substrate 32 and flipped. Second material layer 18*b* is laminated to substrate 32 so that a channel mask 42 can be applied to a surface of first material layer 18*a*. A liquid channel 20 is formed by etching first material layer 18*a* using at least channel mask 42 as a guide. Material layer 18*a* can be etched such that liquid channel 20 is in fluid communication with one nozzle bore 16 or a plurality of nozzle bores 16. The formation of liquid chamber 12 can optionally be finished by partially etching the remaining polymeric material substrate 14 or completed by fully etching polymeric material substrate 14 using at least bore/chamber mask 42 as a guide.

In some etching processes, mask 42 serves as a mask when etching material layer 18*a*, and then, material layer 18*a* serves as the mask when etching polymeric substrate 14. Alternatively, mask 42 serves as the mask when etching material layer 18*a* and polymeric substrate 14.

Mask 42 can be removed either during the etching process (when the etchant is selected such that it removes mask 42 while removing material 18*a*) or after etching is complete using conventional means. Alternatively, mask 42 can remain on the surface of material 18*a*. When etching is complete, second material layer 18*b* is delaminated from substrate 32 forming nozzle plate 28.

Figure 7B:
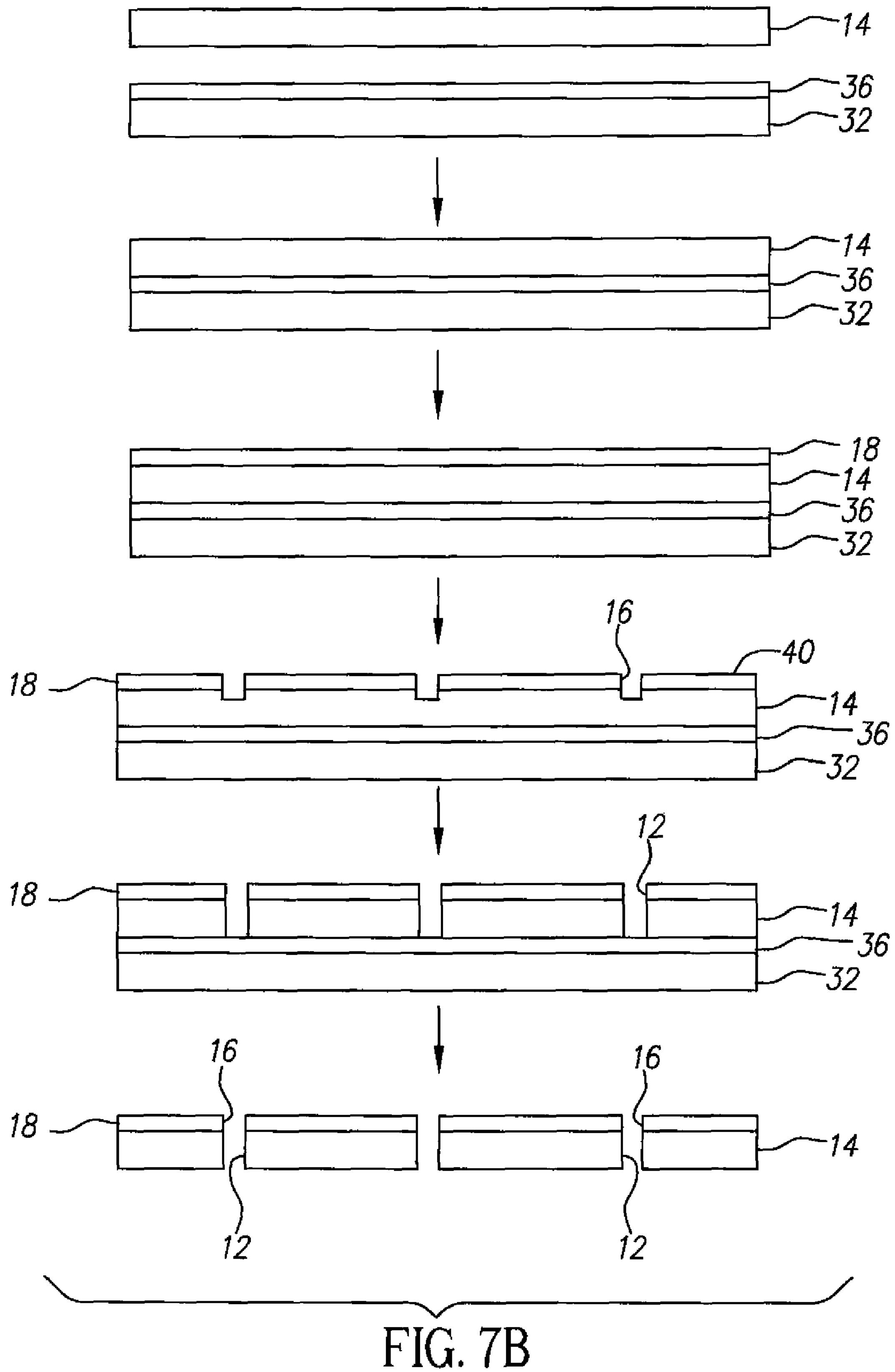
FIG. 7B is a schematic view describing another embodiment of the manufacturing process associated with the formation of the example embodiments of the invention.

Referring to FIG. 7B, front side etching of polymeric substrate 14 begins with polymeric substrate 14 being laminated to substrate 32 using a laminate 36. A material layer 18 is deposited on a surface of polymeric substrate not laminated to substrate 32.

A nozzle bore/liquid chamber mask 40 is applied to material layer 18. Nozzle bore 16 is formed by etching through material layer 18 using at least bore/chamber mask 40 as a guide. Liquid chamber 12 can be formed by fully etching polymeric material substrate 14 using at least bore/chamber mask 40 as a guide.

In some etching processes, mask 40 serves as a mask when etching material layer 18, and then, material layer 18 serves as the mask when etching polymeric substrate 14. Alternatively, mask 40 serves as the mask when etching material layer 18 and polymeric substrate 14.

Mask 40 can be removed either during the etching process (when the etchant is selected such that it removes mask 40 while removing material 18) or after etching is complete using conventional means. Alternatively, mask 40 can remain on the surface of material 18. When etching is complete, polymer substrate 14 is delaminated from substrate 32 forming nozzle plate 28.

Referring back to FIGS. 1-7, fabrication process steps which describe etching preferably use a dry or vacuum-based etching process or processes because dry etching creates an anisotropic or uni-directional etch which help facilitate high-fidelity pattern transfer. The example embodiments of the invention used a reactive ion etching (RIE) etching process, for example, an RIE oxygen plasma etching process. This process is, typically, more amenable to microelectronic fabrication processes and allows tight control (particularly in the plane of the substrate) of the alignment of the features formed when compared to other types of fabrication processes. For example, a plasma of at least oxygen gas can be used to etch polymer substrate 14 and/or material 18, 18*a*, and/or 18*b* when material 18, 18*a*, and/or 18*b* is a poly(siloxanes), poly (silanes), polyimide, or poly(benzocyclobutenes). However, other types of etching processes, including other chemistries, can be used. For example, fluorine-based chemistries can be used to etch material 18, 18*a*, and/or 18*b* when material 18, 18*a*, and/or 18*b* is a silicon nitride or a silicon oxide. Fluorine chemistries can also be used to enhance etching polymer substrate 14 and/or material 18, 18*a* and/or 18*b* when 18. 18A and/or 18*b* is a poly(siloxane), polyimide, poly(silane) or poly(benzocyclobutene).

In addition to silicon nitride, material 18, 18*a*, and/or 18*b* can be an inorganic film, a glass, and/or other types of silicon compounds, for example, silicon oxide, silicon oxynitride, silicon carbide, aluminum oxide, or an organic film, such as those based on poly(siloxane), polysilane, polyimide, or poly (benzocyclobutene). Material 18, 18*a*, and/or 18*b* can be a single layer of material, or a multi-layered stack of the same or different materials. Typically, material 18, 18*a*, and/or 18*b* is 0.5-10 microns thick, preferably 1-6 microns thick, and more preferably 2-4 microns thick.

Polymeric substrate 14 can be made from material including, for example, polyesters such as poly(ethylene naphthalate) and poly(ethylene teraphthalate), and polymers based on poly(ether sulfones), poly(norbornenes), poly(carbonates), poly(cyclo-olefins), poly(acrylates) and polyimides. Typically, the polymeric substrate is 25-300 microns thick, preferably 50-200 microns thick, and more preferably 75-125 microns thick.

Deposition of material 18, 18*a*, and/or 18*b* can include any type of deposition process known in the art. For example, deposition of material 18, 18*a*, and/or 18*b* can be accomplished by sputter deposition, e-beam deposition, thermal evaporation, chemical vapor deposition, or spin-coating.

Fabrication process steps which describe lamination or delamination can include any type of lamination or delamination processes known in the art. For example, lamination can be accomplished using hot lamination processes, cold lamination processes, lamination processes using a nip roller, lamination processes using a pressure diaphragm, or lamination processes conducted under vacuum. Selection of the appropriate laminate depends on the lamination process. For example, laminates can include ultraviolet light curable adhesives, thermally curable adhesives, or pressure sensitive adhesives known in the art. Some examples of adhesives include elastomeric adhesives such as those manufactured by Gel-Pak, a division of Delphon Industries, Hayward, Calif.; and thermal release tapes such as those manufactured by Nitto Denko Corporation, Osaka, Japan. Delamination can be accomplished using, for example, thermally induced delamination, delamination induced by ultraviolet light, pressure induced delamination, solvent-induced delamination, or delamination induced by dry etching.

Alternatively, lamination can be accomplished by treating the surfaces of the items to be laminated such that a bond is formed when the items contact each other that is strong enough to adhere the surfaces of the items together. Examples of these types of surface treatments include, but are not limited to, oxygen or nitrogen plasma treatment, ozone treatment, and thin monolayers of cross-linkable molecules.

The fabrication processes described above find application when forming devices incorporating fluid chambers and/or passageways in polymeric substrates. These devices include, for example, printheads of the type commonly referred to a page wide printheads, see, for example, U.S. Pat. No. 6,663,221 B2, issued Dec. 16, 2003, to Anagnostopoulos et. In a page wide printhead, the length of the printhead is preferably at least equal to the width of the receiver. However, the length of the page wide printhead is scalable depending on the specific application contemplated and, as such, can range from less than one inch to lengths exceeding twenty four inches.

The invention has been described in detail with particular reference to certain preferred embodiments thereof, but it will be understood that variations and modifications can be effected within the scope of the invention.

The invention claimed is:

1. A method of manufacturing a printhead comprising:

providing a polymeric substrate on a carrier substrate with a first material layer positioned between the polymeric substrate and the carrier substrate, the first material layer including a drop forming mechanism, the first material layer being laminated to the carrier substrate with a laminate;

providing a patterned second material layer on a surface of the polymeric substrate that does not contact the first material layer;

removing at least some of the polymeric substrate not covered by the patterned second material layer using an etching process;

removing the first material layer, the polymeric substrate, and the second material layer from the carrier substrate by delaminating the first material layer, the polymeric substrate, and the second material layer from the carrier substrate; and patterning the first material layer.

2. The method according to claim 1, further comprising:

removing at least some of the first material layer not covered by the pattern using an etching process.

* * * * *